United States Patent

Hirn

[15] 3,655,026
[45] Apr. 11, 1972

[54] POSITIVE FEED TRANSFER FOR PIN CONVEYOR

[72] Inventor: Hans Hirn, Iselin, N.J.

[73] Assignee: American Can Company, Greenwich, Conn.

[22] Filed: Aug. 17, 1970

[21] Appl. No.: 64,180

[52] U.S. Cl.................................................198/25, 198/103
[51] Int. Cl............................................................B65g 47/00
[58] Field of Search........................198/20, 22, 26, 25, 103

[56] References Cited

UNITED STATES PATENTS

| | | | |
|---|---|---|---|
| 1,824,414 | 9/1931 | Stein | 198/25 |
| 3,016,153 | 1/1962 | Porterfield | 198/25 X |
| 2,300,359 | 10/1942 | Mohan | 198/25 X |
| 3,300,019 | 1/1967 | Brigham et al. | 198/25 |

*Primary Examiner*—Evon C. Blunk
*Assistant Examiner*—H. S. Lane
*Attorney*—Robert P. Auber, George P. Ziehmer and Leonard R. Kohan

[57] ABSTRACT

A method of and apparatus for transferring flexible tubular articles, such as elongated collapsible tube bodies, from a longitudinal feeding means onto an endless pin conveyor disposed at right angles thereto wherein the articles are positively gripped and transferred from the longitudinal feeding means to the pin conveyor while the latter remains in continuous motion.

16 Claims, 4 Drawing Figures

INVENTOR.
HANS HIRN
BY Leonard R. Kohan
ATTORNEY

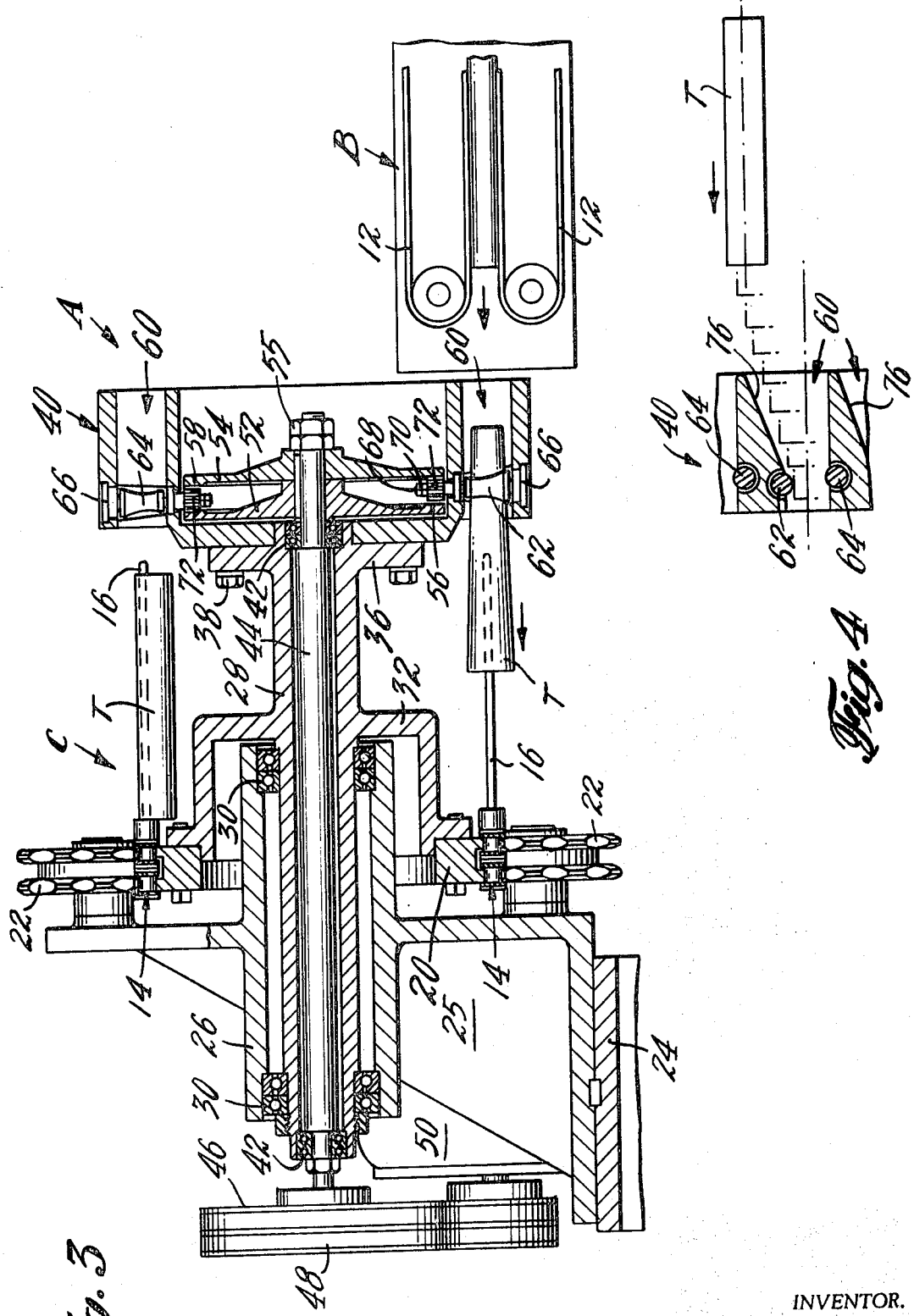

POSITIVE FEED TRANSFER FOR PIN CONVEYOR

BACKGROUND OF THE INVENTION

In the fabrication of elongate tubular articles, such as collapsible tube bodies or body portions formed from metal, metal-plastic laminates, or of plastic, it is desirable to transfer the same from one forming or handling means onto a pin conveyor, i.e., an endless chain conveyor having a series of outwardly extending narrow-diameter pins which loosely receive thereupon the tubular articles. Diverse operations are conventionally performed on the articles while carried by the pin conveyor, such as printing, drying of coatings, baking, etc., as is well known in the art.

While transfer of tubular bodies onto the pin conveyor is easily effected while the conveyor is stationary, it is highly undesirable that the pin conveyor be operated in such an intermittent manner between loadings. Thus, there is the inherent mechanical difficulty of providing a continual start-stop drive for such a conveyor and while achieving relatively high output or production speeds. Further, such cyclic motion of the pin conveyor produces highly undesirable wobbling or jiggling of the articles loosely carried upon the pins, causing the same to be easily dislodged therefrom or otherwise disposed improperly upon the pins for further operations.

Accordingly, transfer of the tubular bodies onto the pin conveyor while the latter is in continuous motion becomes highly desirable for high speed output and to avoid the aforesaid disadvantages of intermittent operation. Continuous motion transfer, however, presents problems of achieving registry between the infed article and the pin conveyor, as well as securely mechanically gripping or handling the lightweight tubular articles as they partake of the complex motions necessitated by the continuous transfer operation.

The continuous transfer of hollow tubular members from diverse infeed means onto pin conveyors has been treated by the prior art, as typified by patents to Hakogi U.S. Pat. No. 2,796,164 or Remington et al., U.S. Pat. No. 3,066,784, but wherein the aforesaid problems as to registry and positive mechanical handling of the articles are not solved.

SUMMARY OF THE INVENTION

The present invention provides a simplified and improved method and apparatus for effecting continuous transfer of tubular articles onto pin conveyors and is chiefly characterized by the provision of means for positively gripping and feeding the articles onto successive pins and wherein also the positive feeding means is maintained in synchronism with he pins during the transfer operation.

In this connection the invention includes a rotary transfer turret located and interposed between infeed conveyor means for the articles and the pin conveyor.

It is a principal object of the invention to provide a transfer apparatus of the type contemplated wherein the tubes are positively gripped while leaving the infeed conveyor, and remain under positive control until deposited onto the pins of the pin conveyor.

It is a further object to provide a transfer turret whose gripping and feed means aids in reshaping the flexible body to its desired tubular configuration should the same have become slightly distorted during prior handling.

It is a major object to provide a transfer turret characterized by a minimum of parts thereby improving trouble-free reliability thereof while yet functioning in the manner aforesaid.

DESCRIPTION OF THE DRAWINGS

FIG. 3 is a sectional view taken on the line 3-3 of FIG. 2, and,

FIG. 4 is a diagrammatic illustration of the relative position of an advancing tubular container as it approaches the moving rotary transfer turret.

DETAILED DESCRIPTION

The transfer means A of the present invention is associated with and disposed between infeed conveyor B and pin conveyor C, and is especially useful in handling elongated and flexible tubular articles T, such as collapsible toothpaste tube bodies formed of plastic, plastic laminates, foils, etc. as is well known in the art.

Figure 1:
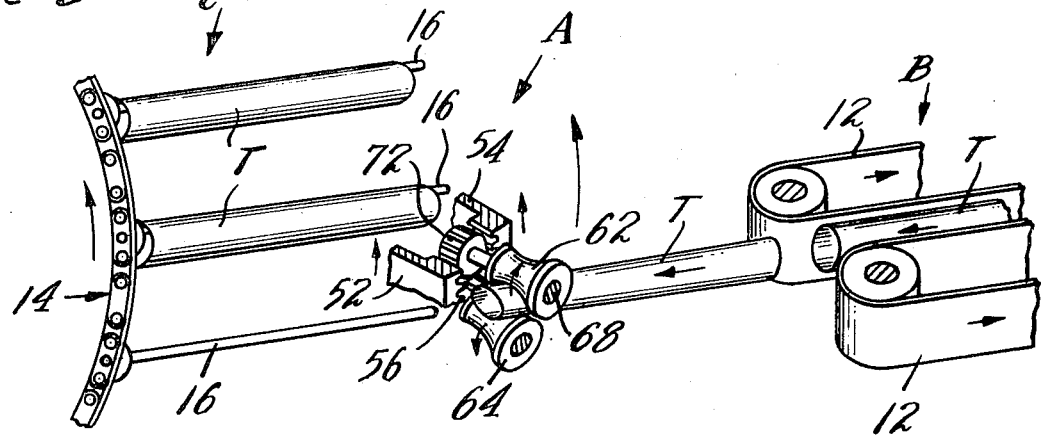
FIG. 1 is a fragmentary perspective view of the infeed conveyor means, rotary transfer turret, and conveyor.

The infeed conveyor B may be of any suitable or conventional form utilized in the production or handling of the elongate tubular bodies T, so long as the same includes a portion or component from which the tubes T are delivered seriatim longitudinally of their axes. In the illustrative embodiment, the infeed conveyor B includes cooperating pairs of flexible endless belts 12, 12 suitably driven whereby the confronting runs thereof, as best seen in FIGS. 1 and 3, deliver tubes T successively therefrom in the direction of the arrow and toward the rotary transfer means A.

Likewise, pin conveyor C may be of any form conventional or known in the art, such as those shown in the aforementioned U.S. patents, and which may conventionally include an endless chain 14 carrying a plurality of laterally projecting pins 16 upon which are successively received the tubes T as delivered thereupon by rotary transfer means A.

The pin conveyor 14 may be driven in conventional manner, and includes channel-like guide rail portions 18 (FIG. 2) on the supporting frame 24 which guide and stabilize the runs of the pin conveyor 14 as they approach and depart the transfer area. Further, the chain 14 is trained around a sprocket 20 (FIG. 3) mounted coaxially with the rotary transfer means A. Suitable frame-mounted idlers 22, 22 further stabilize the chain as it tracks onto and from idler sprocket 20 in maintaining its synchronized arcuate alignment with the rotary transfer means A.

Figure 2:
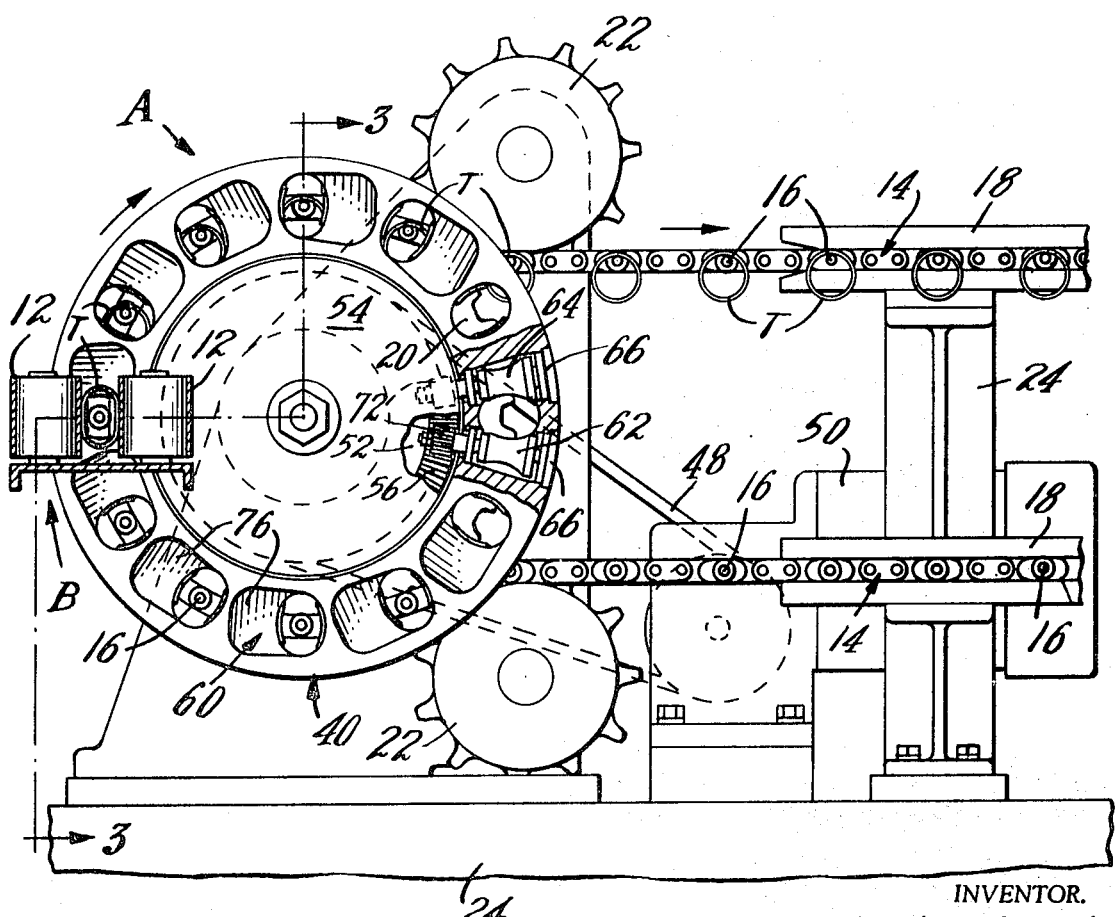
FIG. 2 is a fragmentary end elevation, partly in section, of the rotary transfer turret as associated with the infeed and pin conveyors.

As viewed in FIG. 2, pin conveyor 14 and the rotary transfer means A rotate in a clockwise direction, wherein the tubes T are delivered onto the pin conveyor at or near the nine o'clock position, and pass therewith through the twelve o'clock position and thence laterally to the right as seen in FIG. 2 along the upper conveyor run.

With more particular reference to the rotary transfer means A, and referring to FIG. 3, the supporting framework 24 includes a journal bracket 25. Bracket 25 includes a tubular housing 26 within which is received a tubular shaft 28. The tubular shaft 28 is conventionally journalled as by bearings 30 at opposite ends of housing 26 so as to rotate freely therewithin. Tubular shaft 28 intermediate the ends thereof includes a radially outwardly and rearwardly directed skirted flange 32 which is affixed to the aforesaid pin conveyor sprocket 20.

Tubular shaft 28 at its right-hand end is radially flanged at 36 and is secured as by bolts 38 to an annular turret 40 comprising a portion of transfer means A, as described more particularly hereinafter.

Disposed coaxially within tubular shaft 28 and supported for free rotation as by bearing races 42 is a turret feed roller drive shaft 44. The feed roller drive shaft 44 at its left-hand end as viewed in FIG. 3, is affixed to a drive pulley 46 which is driven by belt 48 from a prime mover 50 (FIG. 2).

At its opposite end, drive shaft 44 has keyed thereto a pair of drive discs 52, 54 and is retained as by bolts 55. Discs 52, 54 are provided with radially disposed and confronting annular rows of gear teeth 56, 58 (FIG. 1), respectively, adjacent the peripheries thereof.

Turret 40 carried by shaft 28 includes a circumferential series of tubular passages 60 through which the tubes T are fed in advancing from infeed conveyor B to pin conveyor C. Positive advance of the tubes T through each passage 60 is effected by cooperating concave roller pairs 62, 64 disposed adjacent each passage as seen in FIG. 2. Each roller is suitably rotatably journalled at its opposite ends within turret 40 as by bearing assemblies 66. A shaft 68 extends radially inwardly from each roller and has a small gear 72 secured thereto as by bolt 70. The gear 72 associated with each roller 64 is meshed with the teeth on outer disc 54, while the gear 72 associated with each roller 64 is meshed with the teeth on inner disc 52. To this end, the mountings for the several rollers 62 are offset or staggered in the turret 40 in an axial direction with respect to rollers 64 as seen in FIG. 4, whereby the gears 72 engage the proper disc 52 or 54 without interference from the teeth of the companion disc.

Accordingly, with particular reference to FIG. 1, it will be seen that as discs 52, 54 are driven by pulley 46 (FIG. 3) at a lower rate of speed than the rotation of turret 40 by pin conveyor C, the feed rollers 62, 64 will in turn be driven by gear discs 52, 54 in opposite directions as indicated by arrows in FIG. 1 thereby to positively feed the tubes T gripped therebetween.

It is important to note that drive shaft 44 in FIG. 3 serves to rotate only gear discs 52, 54 and does not rotate the turret 40, as shaft 44 is freely journalled within the tubular support shaft 28 of the turret.

Drive is imparted to turret 40 through its shaft connection 28 to sprocket 20 which in turn is driven by the conveyor chain 14 of the pin conveyor C. It is evident that while drive to pin conveyor C may be conveniently imparted thereto at another sprocket portion thereof, if desired, the conveyor C might be at sprocket 20 or by suitable gearing from pulley 46 to the tubular shaft 28. In any event, as pin conveyor C is driven, sprocket 20 will be turned thereby, and through tubular shaft 28, the transfer turret 40 will be rotated about and concentrically of the feed roller drive shaft 44. The only requisite is, as is evident, that drive shaft 44 be operated at a relatively higher or lower speed than the turret 40 so as to effect relative movement between gear discs 52, 54 and the turret-carried feed roller drive gears 72. It will be seen that precise speed control of the feed rollers 62, 64 is thereby achieved, as requisite for the operating conditions of the apparatus.

It will be seen from FIG. 2 that the conveyor pins 16 are aligned with the passages 60 through the turret 40. As the turret is in continuous motion at right angles to tubes T as the latter are advanced from infeed conveyor A, means are provided to facilitate smooth transfer of the tubes into each pocket of the feed transfer turret. As seen in FIGS. 2 and 4, the passages 60 of the turret include angled or sloped faces 76 on the side thereof toward the direction of rotation. In this manner, and as indicated by the diagrammatic view of FIG. 4, there exists adequate clearance for the tube T as the tube approaches the passage 60 which is moving at right angles thereto. Successive relative positions of the tube T vis-a-vis the passage 60 are seen in FIG. 4 whereby the sloped face 76 provides clearance for the tube until it is eventually gripped by the feed rollers 62, 64. With this construction, turret 40 may be disposed in close proximity to infeed conveyor B thereby minimizing space requirements as well as effecting prompt pick-up and gripping of the tubes.

It will be seen in FIG. 1 that the axes of roller pair 62, 64 are at right angles to the confronting belt runs 12 of conveyor B at the time of tube pickup by turret 40. This construction provides a further advantage in that any flexure-induced deformation that may have tended to occur as a result of positively gripping and flexing the tube at less than all of its substantially diametrically opposed points, and that may have caused the tube to partake of a slightly elliptical cross-section in passing along infeed conveyor B will be counteracted by the right-angularly related substantially diametrically opposed related squeeze applied to the tube in passing through the feed rollers, whereby the tube will be delivered to pin conveyor C having substantially the desired circular or other cross-sectional configuration.

The operation of the rotary transfer device of the invention is believed apparent from the foregoing. Flexible tubular container bodies T are advanced in single file by infeed conveyor B, as by being lightly gripped between advancing runs of belts 12, 12. As the same approach the passages 60 of the revolving turret 40, the longitudinal axes of the successive tubes T and the passages 60 become increasingly in alignment, clearance being provided for initial advance of the tubes T into the turret passages 60 by the inclined faces 76 thereof. As the tubes T arrive in longitudinal alignment with the axes of the opening 60, the forward ends of the tubes T are positively gripped by the rollers 62, 64. The rollers 62, 64 are driven by the gear discs 52, as aforesaid through shaft 44.

Accordingly, the forward ends of the tubes T are gripped by the feed rollers 62, 64 prior to full release from the infeed conveyor B, are held and guided firmly by the rollers 62, 64, and the tubes are delivered or propelled positively toward and in alignment with the succeeding pins 16 of conveyor C. The rollers advance the tubes T directly onto the pins 16, effecting full delivery of the same thereon prior to divergence of conveyor chain 16 from its aligned arc of travel with turret 40 as the chain passes about sprocket 20. The tubes are then fully supported by the pins 16 and advance for subsequent handling.

While presently preferred embodiments of the invention have been illustrated and described, it will be recognized that the invention may be otherwise variously embodied and practiced within the scope of the claims which follow.

What is claimed is:

1. A transfer device for elongated flexible articles successively handled by first and second continuously driven conveyors comprising:
   a frame,
   a turret rotatively journalled thereon,
   means for driving said turret member in synchronism with said second conveyor so as to be in stationary alignment with respect thereto through a portion of their travel,
   positively driven article gripping and feed means on said turret for positively gripping and delivering articles to said second conveyor, and
   means disposing said turret adjacent said first conveyor to receive successively delivered articles therefrom into said feed means, thereby to positively grip and feed the articles onto said second conveyor.

2. The transfer device of claim 1 wherein said turret has a plurality of passages therethrough disposed parallel to the turret axis with said feed means disposed in said passages.

3. The transfer device of claim 2 wherein said feed means comprises a pair of spaced cooperating driven rollers carried by said turret and disposed adjacent said passages for gripping and propelling articles delivered thereinto.

4. The device of claim 3 wherein said rollers are driven by gear means including annular drive gears disposed coaxially of said rotary turret, and means rotating said annular gears at a speed relative to that of said turret, thereby to impart article-feeding rotation to said rollers.

5. The device of claim 3 wherein said second conveyor comprises a pin conveyor whose pins are longitudinally aligned with said passages during said turret synchronism with said second conveyor for reception thereon of the articles delivered to and through said passages.

6. The transfer device of claim 3 wherein said turret is disposed substantially perpendicular to the direction of feed of said articles, and,
   said passages include inclined surface portions thereof which are angled in the direction of rotation of said turret so as to facilitate lead-in of articles delivered thereinto from said first conveyor.

7. In combination,
   a first conveyor for advancing flexible tubular articles longitudinally in single file,
   a second conveyor for receiving said articles upon a series of pins carried thereby, said second conveyor including a chain carrying said pins and a sprocket about which said chain is trained, and, means for moving said pins through an arcuate path during a portion of their travel, a rotating transfer device disposed between said first and second conveyors, said rotating transfer device comprising a turret disposed coaxially with said sprocket and having means for delivering the same on to the pins of said second conveyor, said positive gripping means including pairs of feed roller means in a circular series and being aligned with said pins along said path during a portion of said chain travel about said sprocket.

8. The structure of claim 7 further including a tubular shaft secured to said conveyor sprocket upon which said turret is mounted, whereby said turret rotates in unison with said sprocket.

9. The structure of claim 8 wherein said pairs of feed roller means are cooperatively associated, and said gripping means further includes means driving said feed roller means, said driving means including a drive shaft disposed within said tubular shaft.

10. The structure of claim 9 further including pinion gears associated with each said feed roll, and, a pair of ring gears carried by said drive shaft, with one of said ring gears associated respectively with one feed roll of each said pair.

11. The structure of claim 9 wherein said turret includes a circular series of passages through which said articles are fed, said gripping means being disposed in each said passage, and, said passages being disposed in longitudinal alignment with said pins during rotation of the latter about said sprocket.

12. The structure of claim 11 wherein each said passage is enlarged adjacent said first conveyor to prevent interference between said articles as the same advance longitudinally from said first conveyor toward said rotating turret.

13. The structure of claim 11 wherein said first conveyor includes means gripping said articles on opposite sides thereof for advancing the articles toward said rotary turret, and, each said feed roll pair is oriented in said turret to grip said articles on opposite sides thereof and substantially at right angles to said first conveyor gripping means, thereby to counteract any flexure deformation imparted to said articles by said first conveyor.

14. A method of transferring elongated flexible tubular articles between conveyors comprising the steps of gripping an article by means of a first conveyor at less than all substantially diametrically opposed points on said article, delivering said article to a second conveyor, by means of a rotating transfer device, positively gripping and flexing said article by means of said transfer device while delivering said article to said second conveyor, said positive gripping and flexing being effected at points on said article opposed and substantially at right angles to less than all of the first-named points, thereby restoring a desired cross-sectional configuration to said flexible article, and propelling said positively gripped article toward said second conveyor for delivery thereonto while said propelled article and said second conveyor are in synchronized movement.

15. The method of claim 14 wherein said articles are delivered from the first conveyor in a direction longitudinally of their length, and are transferred to said second conveyor while moving in a further path substantially perpendicular to said direction.

16. The method of claim 15 wherein said articles are gripped at all times between said first conveyor and said second conveyor thereby to maintain positive control thereof.

* * * * *